United States Patent [19]
Duff et al.

[11] Patent Number: 5,644,487
[45] Date of Patent: Jul. 1, 1997

[54] MONITORING AND CONTROL SYSTEM AND METHOD

[75] Inventors: Stephen B. Duff, Palmyra, N.J.; Jack S. Paltenstein, Ft. Washington, Pa.

[73] Assignee: Moore Products Co., Spring House, Pa.

[21] Appl. No.: 138,848

[22] Filed: Oct. 19, 1993

[51] Int. Cl.⁶ .................................................. G05B 11/01
[52] U.S. Cl. ........................ 364/140; 364/147; 364/192
[58] Field of Search ............................. 364/131–147, 364/188–192; 395/275, 325, 375, 500, 650, 700

[56] References Cited

U.S. PATENT DOCUMENTS

| | | | |
|---|---|---|---|
| 5,168,441 | 12/1992 | Onarheim et al. | 364/146 |
| 5,198,990 | 3/1993 | Farzan et al. | 364/560 |
| 5,291,389 | 3/1994 | Iwata | 364/140 |
| 5,327,546 | 7/1994 | Yokoi et al. | 395/425 |
| 5,392,207 | 2/1995 | Wilson et al. | 364/147 |

OTHER PUBLICATIONS

Moore Information Bulletin P139–3, Issue 1 pp. 1–13, Mar. 1993.
Control Engineering Article "A DCS–PLC Combination Puts Functions Into Modules", pp. 36–37, Aug. 1992.

*Primary Examiner*—Paul P. Gordon
*Assistant Examiner*—Thomas E. Brown
*Attorney, Agent, or Firm*—Seidel, Gonda, LaVorgna & Monaco, PC

[57] ABSTRACT

In a distributed process-control system, program-controlled apparatus is provided for permitting an operator to control the mode of a Sequential Function Chart (SFC) to place the Chart in any of five different modes as a convenience in monitoring, editing and/or changing the SFC program. These modes are: OFF mode, for temporarily disabling operation of the SFC Chart, an AUTO mode which allows the SFC program and Chart to run as configured, a HOLD mode which freezes the chart in its current state, a MANUAL mode enabling the operator to force the Chart to an operator-selected step while the output of the current step is maintained active, and a TRACE mode enabling the operator to view the steps in the Chart sequentially, and to force the steps without executing them.

8 Claims, 10 Drawing Sheets

MONITORING AND CONTROL SYSTEM AND METHOD

FIELD OF THE INVENTION

This invention relates to improvements in monitoring and control systems and methods, and particularly to such systems and methods which make use of Sequential Function Chart programming language of the type specified by the International Process Control Standard IEC 1131-3.

BACKGROUND OF THE INVENTION

Systems are known and in commercial use in which there are provided, at various locations, a plurality of sensing means for sensing conditions at those locations, and a plurality of control means for controlling these conditions. The sensors and the control means are typically connected to so-called "controllers", usually one at each of the locations and each usually having its own microprocessor. The controllers in turn are connected, for example over two-wire lines, to a programmer station containing a computer, where the signals from the controllers are processed and, typically, displayed; signals are also sent from the computer to the controllers for controlling the control means at the various locations.

It is also known to provide on the monitor of the programmer station a plurality of programming "window" displays selectable by an electrical "mouse" or by manipulation of a keyboard, each displaying its information in a different window. For example, pursuant to the IEC 1131-3 Standard, four languages may be displayed, namely Ladder Logic Diagram, Function Block Diagram, Structured Text and Sequential Function Chart (SFC), the natures of which are set forth hereinafter. One of these, the Sequential Function Chart or SFC, is similar to a flow diagram in that it displays the sequence of steps to be performed by the program. These languages may be used in establishing programs for running the controllers and, by using mouse and/or keyboard, each display and the corresponding program can be monitored, edited and changed as desired.

The present invention is primarily concerned with a portion of the system comprising a control system which permits an operator to monitor, edit and/or change the Sequential Function Chart which corresponds to the program for a selected controller microprocessor. However, while the IEC 1131-3 Standard provides for and specifies the nature of the SFC language, it does not offer any suggestion as to how a Chart may conveniently be monitored, edited and/or changed.

More particularly with regard to the history of the prior art, many industrial processes can be automatically controlled by computing equipment that receives the results of sensor equipment, calculates results, and generates signals to actuating devices. The earliest versions of such equipment typically included meters and gauges so that a human could observe sensor and controller signals. The early equipment also typically included dials and switches so that a human could establish desired operating points and operating modes. As computing technology became available, the control functions were distributed between many computing devices. Certain computing devices were created specifically to perform high speed control calculation functions. Other computing devices were created to perform human interface functions. Still other computer devices were created to perform other specialized functions such as data recording, alarm detection, etc. This latter type of industrial control system is generally known as a "Distributed Control System" (DCS).

Computing devices of the DCS type are typically general purpose devices capable of performing a number of different control calculations. The exact nature of the control calculation is established by each individual user via a variety of different mechanisms, generally computer programs. Some manufacturers use data tables entered by the user to establish the control calculations. Many other methods are also used to establish the control calculations.

An effort to standardize the method used to establish control calculations began several years ago. The result of this effort is the Standard 1131-3 of the International Electrotechnical Commission (IEC) referred to above. This standard specifies the five different methods or program languages mentioned above, namely Function Block, Ladder Diagram, Structured Text, Instruction List, and Sequential Function Chart. A control computer that permits use of any selectable one of these languages, i.e. Function Block, Ladder Diagram, Sequential Function Chart and Structured Text to establish control calculations was introduced by Moore Products Co. of Springhouse, Pa. in 1992. A Product Information bulletin PI39-3, Issue 1, published in March of 1993 by Moore Products Co. describes such a distributed control system permitting use of any of these four methods or languages, and is included in this specification at its end as Appendix I. This is also described in an article entitled "A DCS-PLC COMBINATION PUTS FUNCTIONS INTO MODULES" appearing in the August 1992 issue of "*Control Engineering*" and comprising Appendix II of this specification.

The Sequential Function Chart (SFC) method or language is a means to describe a sequence of program actions and steps graphically. The graphical representation of the sequence reduces the engineering time to develop, enter, trouble shoot and maintain a sequential process control strategy. SFC's are typically used in batch chemical and pharmaceutical applications and for the control of discrete parts manufacturing equipment, although they may be used for many other purposes as well.

The 1131-3 standard for the Sequential Function Chart method does not provide any particular means for an operator to control exactly how the SFC functions; however, how it functions can be important depending on the situation, for example, to meet the needs of an operator of a chemical process or manufacturing machine, and permit the operator to assume control of the execution of one or more SFC's so as to monitor, edit or change the corresponding program.

SUMMARY OF THE INVENTION

In accordance with the invention, an SFC mode-control system is provided with the ability to selectably operate the SFC in one of a plurality of modes, including at least one in which the operation of the Chart is arrested, and including some in which the Chart evolution, once arrested, can then be selectively forced to the next step by the operator, thus enabling convenient monitoring, editing and change of the Chart and its associated program.

In a preferred embodiment, this is implemented by providing a window displayed Chart-mode control box on the monitor of the programmer station, provided with mode-selection "buttons", one to initiate an OFF mode, another to initiate an AUTO mode, another to initiate a HOLD mode, another to initiate a MANUAL mode, and still another to initiate a TRACE mode. The characteristics of each of these modes are set forth hereinafter. This mode control system enables the operator to arrest evolution of the Chart to permit the programmer to examine the state of the Chart; to start the evolution of the Chart; to disable activation of the Chart program; to reset the evolution of the Chart; and to force any step to become active. Preferably also, controls are provided to enable steps, and to disable steps.

BRIEF DESCRIPTION OF THE DRAWINGS

Other objects and features of the invention will become more apparent from a consideration of the following description, taken with the appended figures, in which.

DETAILED DESCRIPTION OF PREFERRED EMBODIMENTS

Figure 1:
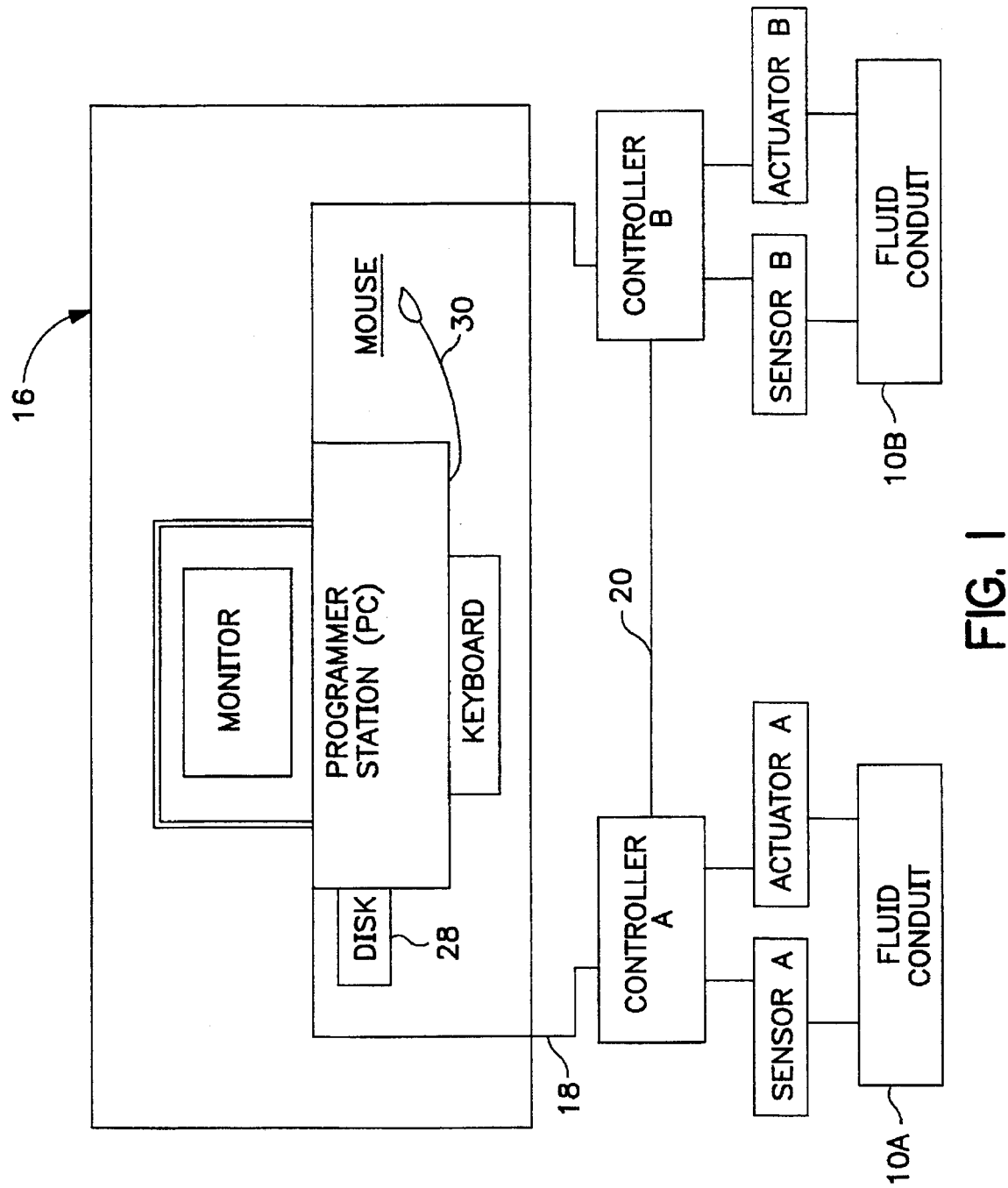
FIG. 1 is a schematic diagram of the layout of a typical process control system to which this invention is applicable.

Referring now to the specific embodiment of the invention shown in the drawings, there are shown in FIG. 1 two locations A and B in a processing plant at which are located two fluid containers or conduits 10A and 10B. Sensors A and Sensors B are provided to sense parameters of a fluid in the conduits, such as velocity, temperature, level, etc.; actuators A and B constitute means for controlling parameters of the fluid, for example, by controlling a valve, a pump or a heater (not shown). Controller A receives from sensor A signals indicating the values of selected parameters of the fluid at A, and based on a program contained within it, sends signals back to the actuator A to control its status. Controller A typically contains a microprocessor with memory, in which a program is stored for responding to sensor A to control actuator A. A programmer station 16 exerts control on the operation of the controller microprocessor primarily by operator-initiated changing of its program, or by feeding the controller varying information produced by its processing of data received from the controller over line 18.

Controller B may be essentially the same as controller A, and is similarly connected to programmer station 16. In some embodiments, especially those using a simple two-wire line for interconnections, controllers A and B may be interconnected with each other over line 20. In the preferred embodiment, each controller is handled separately, so only controller A will be referred to hereinafter.

In this example, the programmer station may be an IBM PC using a 386 microprocessor and the 4-mation™ software described in Appendix I hereof, written in an enhanced version of the "C" programming language. A usual high-capacity storage disc 28 and a mouse 30 are typically provided. In the preferred embodiment the system program has "windows" capabilities, preferably using the M.S.— Windows 3.1 Operating System, and can use any or all of the above-mentioned five languages. However, the present invention is concerned primarily with the Sequential Function Chart language, and hence only this language will be referred to. Further details of this SFC system are presented in Appendices I and II hereof.

The software for running the system is preferably the 4-mation™ software, which is a type which can be run on-line or off-line. In the on-line configuration, the SFC program is created, and is stored in a control module. This system is interactive in the sense that a program at a selected controller can be uploaded to the programer station and presented there in graphic form, since the graphics for the chart have been saved, preferably in the controller. Thus the programmed controllers can be allowed to operate as desired and, at any time when it is desired to monitor, edit and/or change the program, the controller program can be uploaded to the programmer station and, with the aid of the saved graphics, presented in SFC format on the monitor screen. Alternatively, a system can be used in which the graphics are saved at the programmer station.

Figure 2:
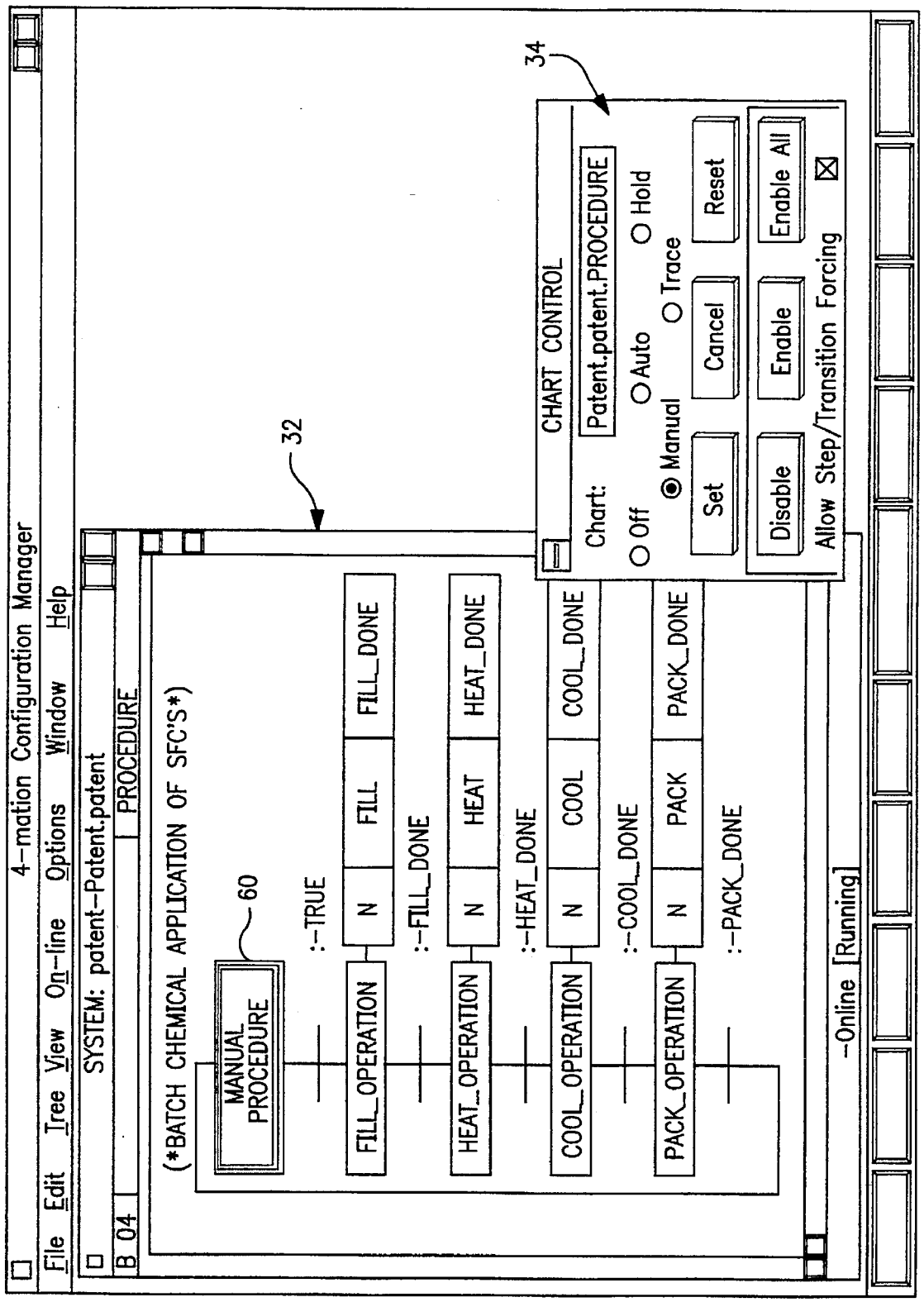
FIG. 2 is a view of the screen of the computer monitor at the programmer station and it displays an SFC Chart and a mode control box, in separate windows.
Figure 3:
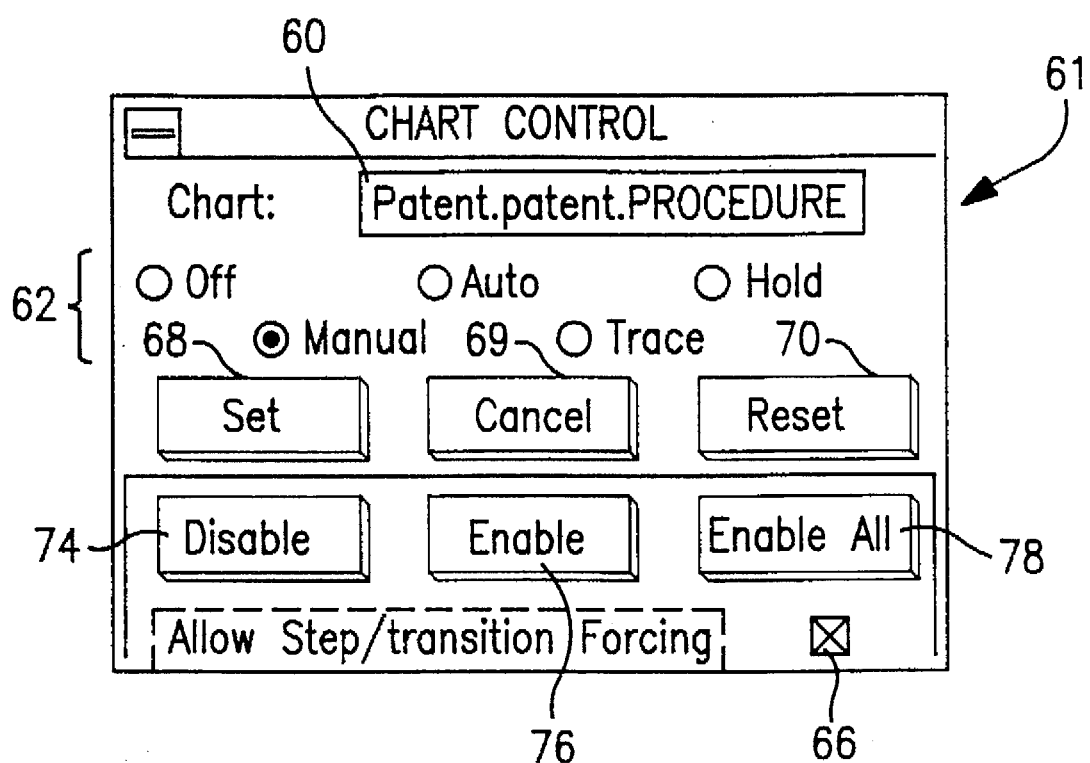
FIG. 3 is an enlarged view of the mode control box of FIG. 2.
Figure 4:
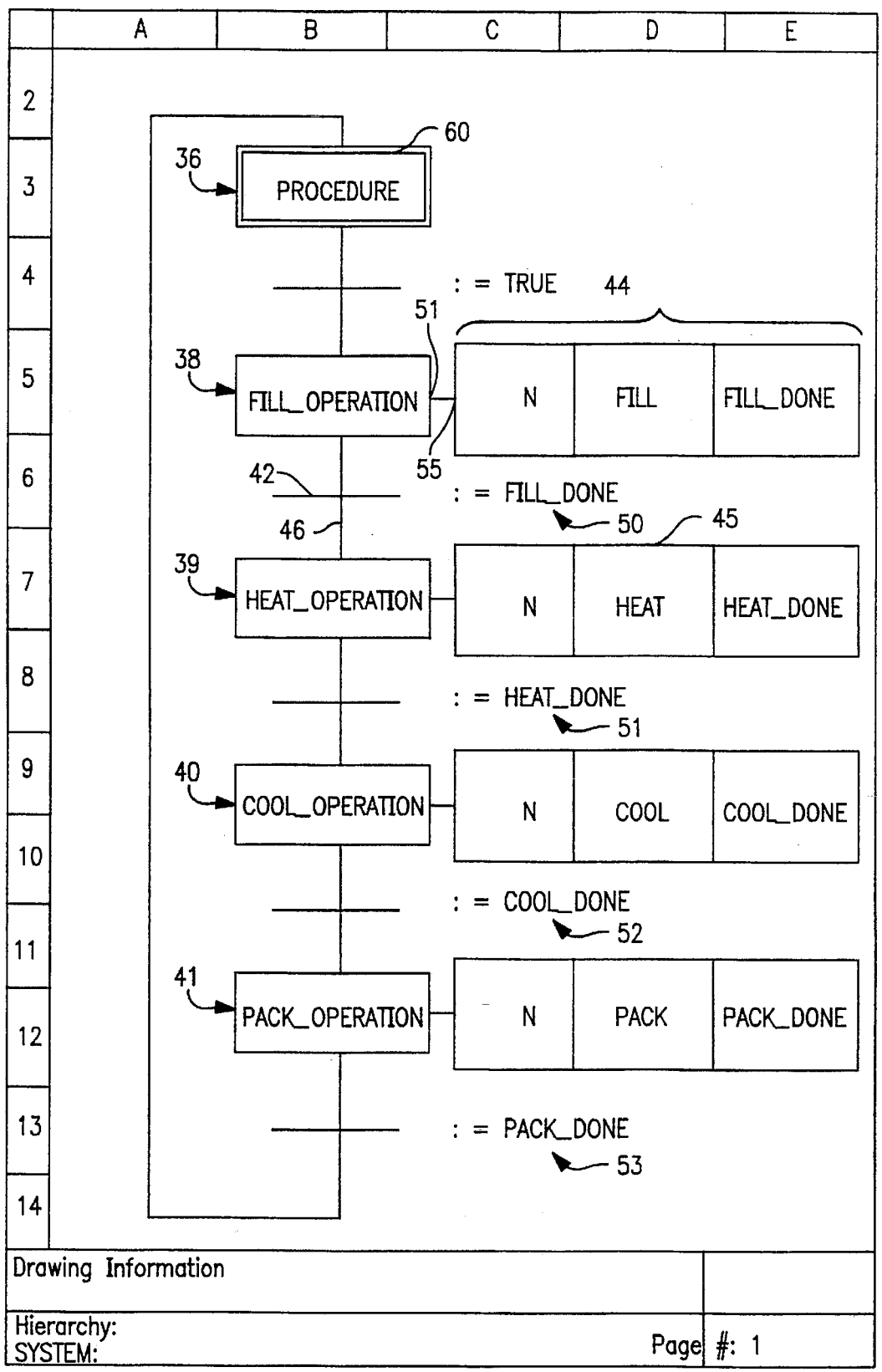
FIG. 4 is an enlarged view of the SFC of FIG. 2.

Referring again to the Figures, FIG. 2 illustrates two windows 32 and 34 on the monitor of the programmer station which are presented by the 4-mation™ software. 32 is the window containing the Sequential Function Chart, and 34 is the Chart Control dialogue box, shown more clearly in FIG. 3. FIG. 4 shows the Sequential Function Chart alone, for clarity. It is composed of an initial step 36, steps such as 38, 39, 40, 41, transitions such as 42, action blocks such as 44, actions such as 45 and connecting lines such as 46. Each transition is associated with a transition condition such as 50, 51, 52, 53 which is programmed in the Structured Text language specified by the International Electrotechnical Commission International Standard IEC 1131-3: 1993, "Programmable Controllers—Part 3: Programming Languages" (First edition 1993–03).

The rules of programming using the Sequential Function Chart language are specified in the standard. A Sequential Function Chart is a collection of programming elements (initial steps, steps, transitions, action blocks and connecting lines) constructed according to the rules of the Sequential Function Chart language. Chart evolution begins at the "initial step" and evolves from one or more steps in the Chart to one or more other steps in the Chart through transitions, according to the rules of the language. Transition conditions must always evaluate to a true or false result. Transitions pass control from a preceding step to a succeeding step when the transition condition evaluates to a true result and the preceding step(s) is active. For example, in FIG. 4, if the "fill operation" 38 is currently active, the "heat operation" step 39 will become active, and the "fill operation" step 38 will become inactive, when the transition condition 50 associated with the transition 42 below step "fill operation" 38 evaluates to a true result. In this way, the Chart evolves from step to step.

In the preferred embodiment, a color monitor is used with the 4-mation™ software which causes the states of the program variables, to be presented in colors distinct from each other (e.g. an active step's color is green while an inactive step's color is white).

The IEC 1131-3 also specifies the ability to diverge and converge sequences. The concepts of divergence and convergence are presented here as background so that it is clear to the reader that Charts may become increasingly complex. As Charts become more complex, the need for Chart control increases due to the increasing likelihood that the Chart will need to be debugged.

Divergence is the evolution of a single, current step to multiple steps through one or more transitions. Convergence is the evolution of multiple, current steps (not necessarily all active) through one or more transitions to a single step. These operations are programmed through special connection elements as specified in the IEC 1131-3 specification. The two forms of divergence are simultaneous divergence and selective divergence. Simultaneous divergence allows multiple steps to become active simultaneously, while selective divergence requires one and only one of many possible steps to become active as a result of evolution through an associated transition.

When a step changes state from inactive to active through evolution of the Chart, its true-false output, represented in FIG. 4 as the output on the right side 54 of the step's block outline and connected to the left side of the action block 44, changes from false to true.

Action blocks have a true-false input (FIG. 4, 55). When this input becomes true, an algorithm, called the Action Control Block in the IEC 1131-3 specification, is invoked and results in another true-false output, called the Q output, which activates the action. There are other inputs to the Action Control Block that the user configures to optionally control the way the action is activated. A complete list of these options may be found in the IEC 1131-3 specification and includes, but is not limited to, activation time limiting, time delay before activation and immediate activation.

CHART CONTROL DIALOGUE BOX ELEMENTS

In FIG. 2, the outline 60 around the initial step of the Chart is called the cell cursor. It is a cursor that is used by the programmer to select locations, areas and objects in the program windows. One of the objects which a programmer may select is a Sequential Function Chart. Selection of a Sequential Function Chart is accomplished by placing the cell cursor on a subcomponent of the Sequential Function Chart (e.g., the initial step).

FIG. 3 illustrates the Chart Control dialogue box 61 used by the programmer to help debug Sequential Function Chart logic, in accordance with this embodiment of the invention. If the Chart Control dialogue box is currently displayed when the Chart is selected, the dialogue box controls (e.g. buttons, text and check boxes) in the dialogue box are initialized appropriately, depending on the state of the Chart variables in the controller. For example, in FIG. 2, the name of the Sequential Function Chart (which must also be the name of the initial step of a Chart) is "PROCEDURE". When the Chart is selected, the name "Patent.patent.PROCEDURE" appears in the Chart name text box 63, indicating that "PROCEDURE" has been selected.

Once the Chart has been selected, all of the controls of the Chart Control dialogue box are executable with respect to the selected Chart. Each of the five buttons in the button group 62 corresponds to one of the five possible modes of the Chart. The modes and the permissible operations for each of them, are summarized in Table I hereof.

Placing the Chart in the OFF mode stops the evolution of the Chart at the step(s) which was last current in the Chart's previous mode. A Chart in the OFF mode does not activate step outputs or actions, does not evaluate transitions, and does not evolve. It does allow the reset function to be used. The ENABLE, DISABLE and ENABLE ALL functions are disallowed in the OFF mode.

A Chart in the AUTO mode is considered to be in the normally executing state. It enables actions, evaluates transitions and evolves automatically, i.e. without operator intervention, as described earlier. The RESET function is not allowed in the AUTO mode. The ENABLE, DISABLE and ENABLE ALL functions are disallowed in the AUTO mode.

Placing the Chart in the MANUAL mode stops the evolution of the Chart at the step(s) which was last current in the Chart's previous mode. The step output of the current step(s) is active and any associated action block of the current step(s) is active. If the Q output of the Action Control Block becomes true, the associated action is activated. Transitions are not evaluated, but manual evolution of the Chart may be forced by using the mouse or by using the keyboard to manipulate the cell cursor while the "Allow Step/Transition Forcing" box 66 is marked with an X, enabling the forcing feature. The RESET function is not allowed in the MANUAL mode. The ENABLE, DISABLE and ENABLE ALL functions are allowed in the MANUAL mode.

Placing a Chart in the HOLD mode stops the evolution of the Chart at the step(s) which was last current in the Chart's previous mode. This mode is the same as the MANUAL mode except that Chart evolution may not be manually forced and the ENABLE, DISABLE and ENABLE ALL functions are disallowed. The RESET function is not allowed in the HOLD mode.

Placing a Chart in the TRACE mode stops the evolution of the Chart at the step(s) which was last current in the Chart's previous mode. Transitions are not evaluated, but may be manually forced by using a mouse or by using the keyboard to manipulate the cell cursor, while the "Allow Step/Transition Forcing" box 66 is marked with an X, enabling the forcing feature. All action blocks associated with the Chart are prevented from activating actions, when the associated step is active. The RESET function is allowed in the TRACE mode. The ENABLE, DISABLE and ENABLE ALL functions are allowed in the TRACE mode.

By selecting one of the mode buttons from the button group 62, then selecting the SET button 68, the programmer can change the mode of the Chart. The Cancel button 69 may be used to restore the state of the button of group 62 last set by the SET button 68. The RESET button 70 may be used to reset the Chart. When the Chart is reset, all steps are deactivated and the initial step is made the only current step in the Chart.

The DISABLE button 74, ENABLE button 76 and ENABLE ALL button 78 are used to disable and enable steps. A disabled step may become a current step in the evolution, but its output will not become active, while an enabled step will activate its output upon becoming a current step. The ENABLE ALL button 78 is a programmer convenience button that enables all of the steps in the selected Chart.

The "Allow Step/Transition Forcing" box 66 may be placed in a condition in which it is marked with an X in the TRACE or MANUAL mode to allow the evolution of the Chart to be manually forced by the user, by using a mouse or by using the keyboard to manipulate the cell cursor. By clicking the mouse on an active step, the step becomes inactive. By clicking the mouse on a inactive step, the step becomes active. By clicking the mouse on a transition while the Chart is in a mode which allows manual evolution, the Chart is evolved from the current step(s) to the succeeding step(s) of the Chart according to the rules of evolution.

Operation and Use of System

Figure 5:
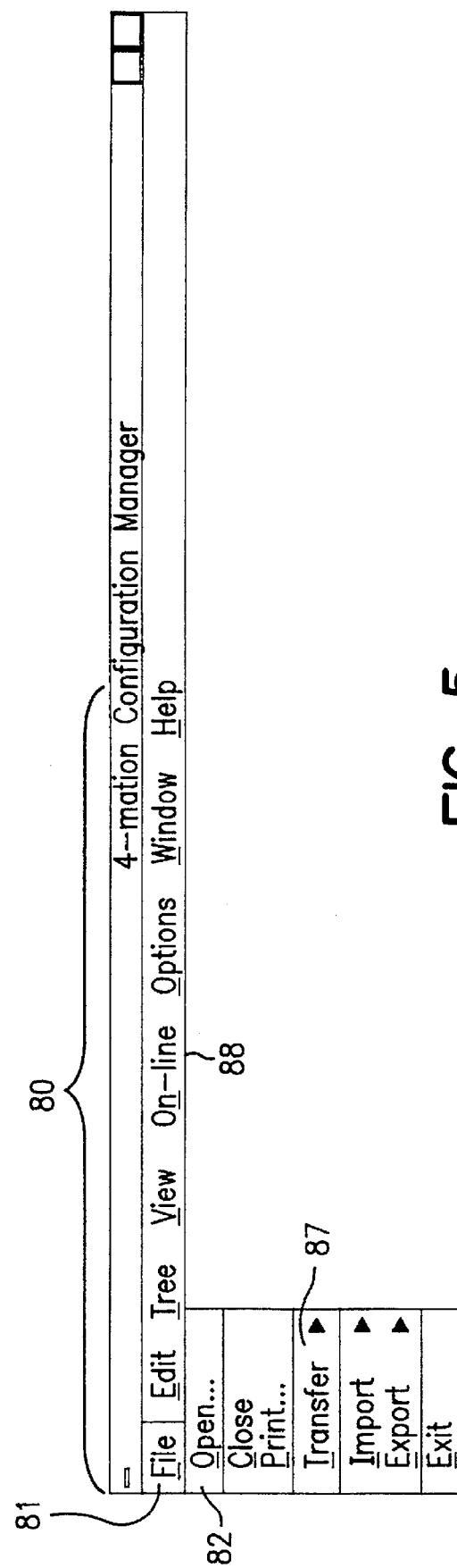
FIGS. 5–10 are views of the monitor screen during successive steps in setting up and using the system.
Figure 6:
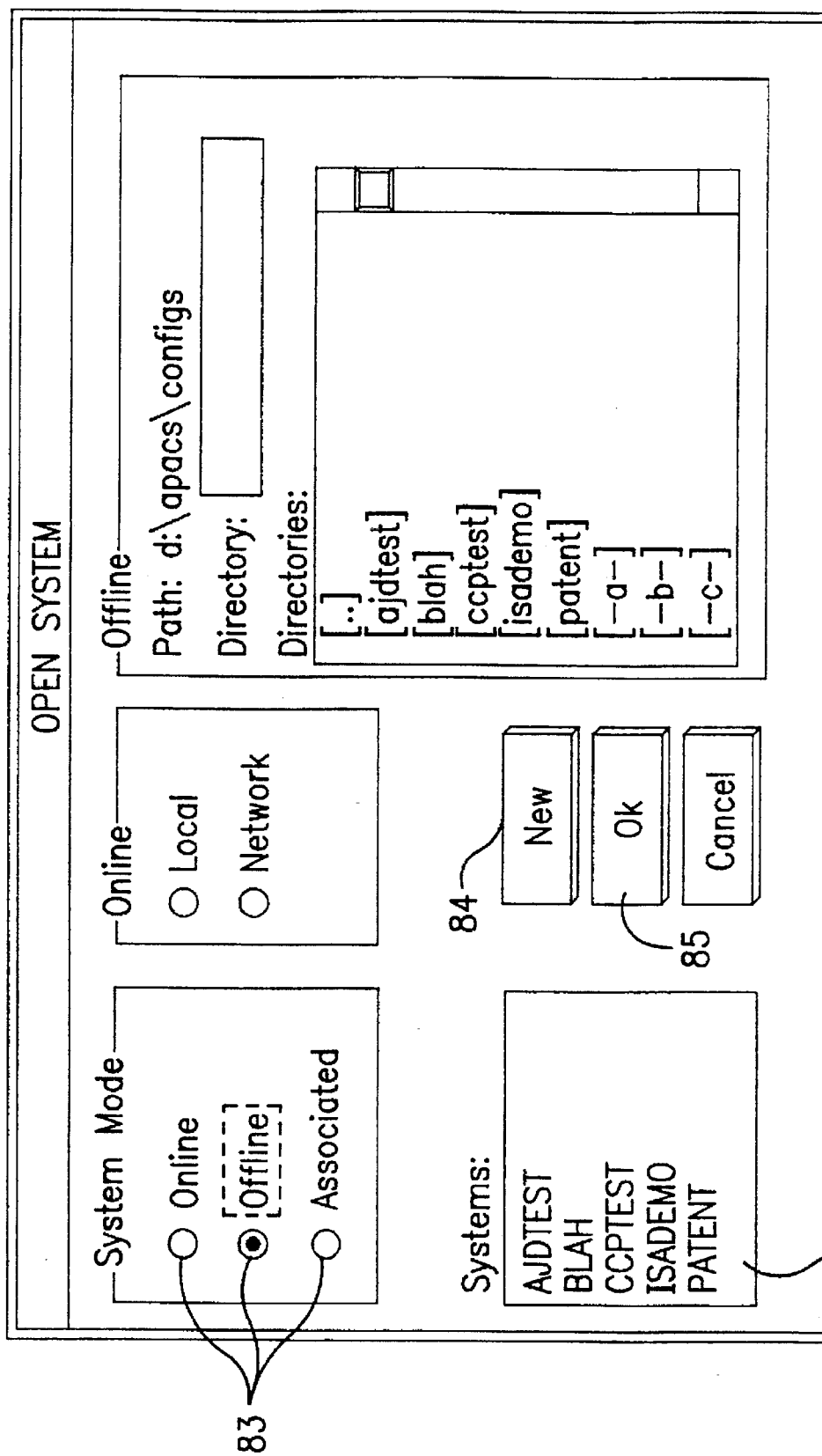

To use the provided system, the user must first set up the control equipment described earlier. The 4-mation™ software must then be installed on the programmer's station. The controller software (not the user program) must be installed in the controller. These are accomplished through standard installation techniques well known in the industry. The operator of the programmer station must then invoke the execution of the 4-mation™ software. The programmer will see a main menu 80 in FIG. 5. The "File" choice on the main menu 81 is selected using the mouse or the keyboard and the "Open . . . " submenu choice 82 is selected, again using the mouse or the keyboard. A dialogue box (FIG. 6) appears allowing the operator to select online or offline operation using radio buttons 83.

Figure 7:
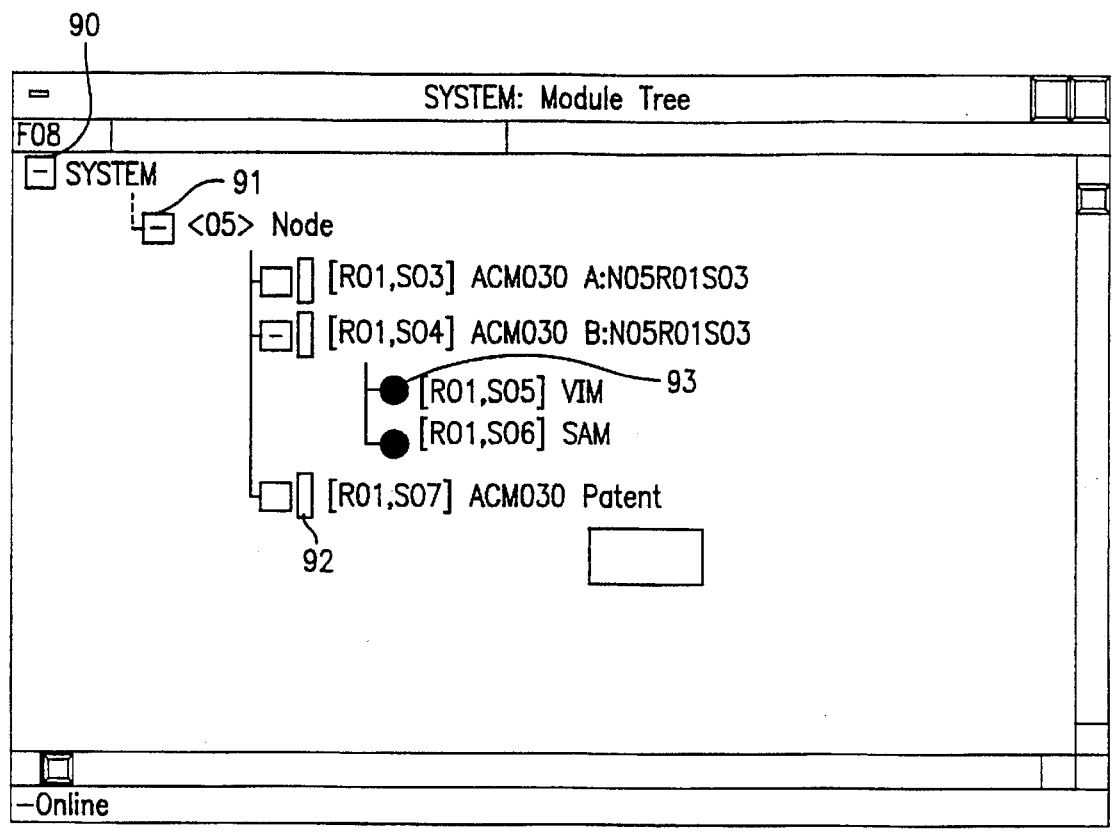

A module tree display (FIG. 7) shows a graphical representation of the physical equipment (controllers, communication equipment, I/O hardware, etc.) and their relationships to each other within the communications architecture. In the dialogue box (FIG. 6) the operator may create a new system or open an existing system by pressing the New button 84 or the OK button 85 respectively. Once a system is in existence (offline or online), it may be opened for display by pressing Ok button 85 after selecting the name of the system in system list box 86. If operation is online, the system depicted is derived from the physical organization of the equipment attached to the programmer station through the communication system. If operation is offline, the operator must model the physical configuration to be programmed by graphically editing the module tree display (FIG. 7) to represent a system organization.

When the system is opened, a module tree display (FIG. 7) appears in a window. This display is organized in a hierarchical tree structure. The root element of the module tree 90 appears in the upper left corner of the display and represents the system. The children 91 of this element are graphical elements representing uniquely addressed communications modules which provide physical, electrical and logical grouping of subordinate modules. The children, such as 96, of these elements are elements representing the physical controller modules. The controller module element 92 represents a typical controller module in the representative system. It may have children 93 which represent physical modules that perform data acquisition and actuator control. These modules, known as I/O modules in the industry, have physical electrical connections to the process equipment (eg., valve actuators, motors, etc.).

By using the cell cursor described earlier, the operator may select one of the graphical controller modules in the module tree display. While in the online mode, a number of operations may be performed on the physical controller module represented by the selected graphical element. One of these operations might be to transfer a user program, stored on the hard disk drive of the programmer station, to the physical controller for execution of the control program. Another operation available allows the programmer to open the controller for editing the program already contained by the controller module. This open operation is accomplished by the programmer by double-clicking the mouse on the graphical controller element 92. When this action is performed, the controller's program is opened and uploaded from the controller into the memory of the programmer station.

Figure 8:
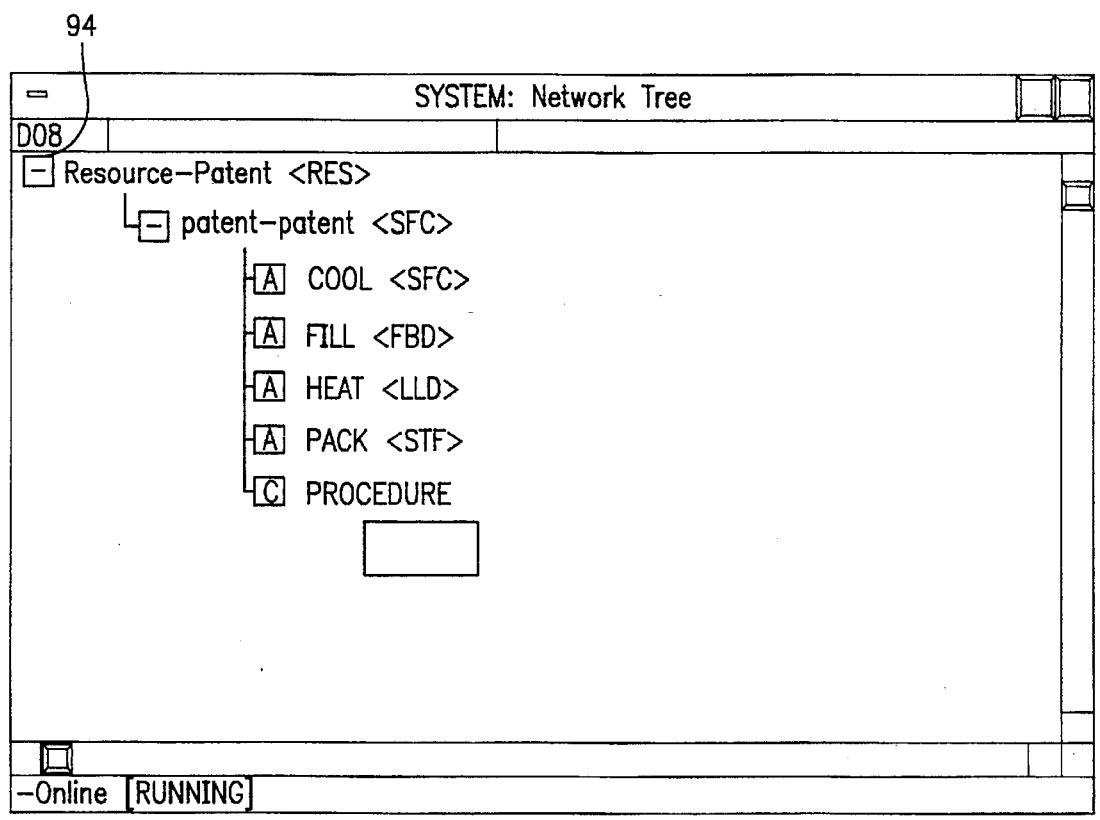

The initial display of a newly opened program is the Network Tree display (FIG. 8). The network tree display shows elements graphically representing all of the program organizational units (as defined by the IEC 1131-3 specification) in the program, organized into a hierarchy where a parent element "invokes" a child element. Invoking a child element may be one of three types: a program block invocation, a function block invocation or an action block invocation. Refer to the IEC 1131-3 specification for definitions of these types of invocations.

Figure 9:
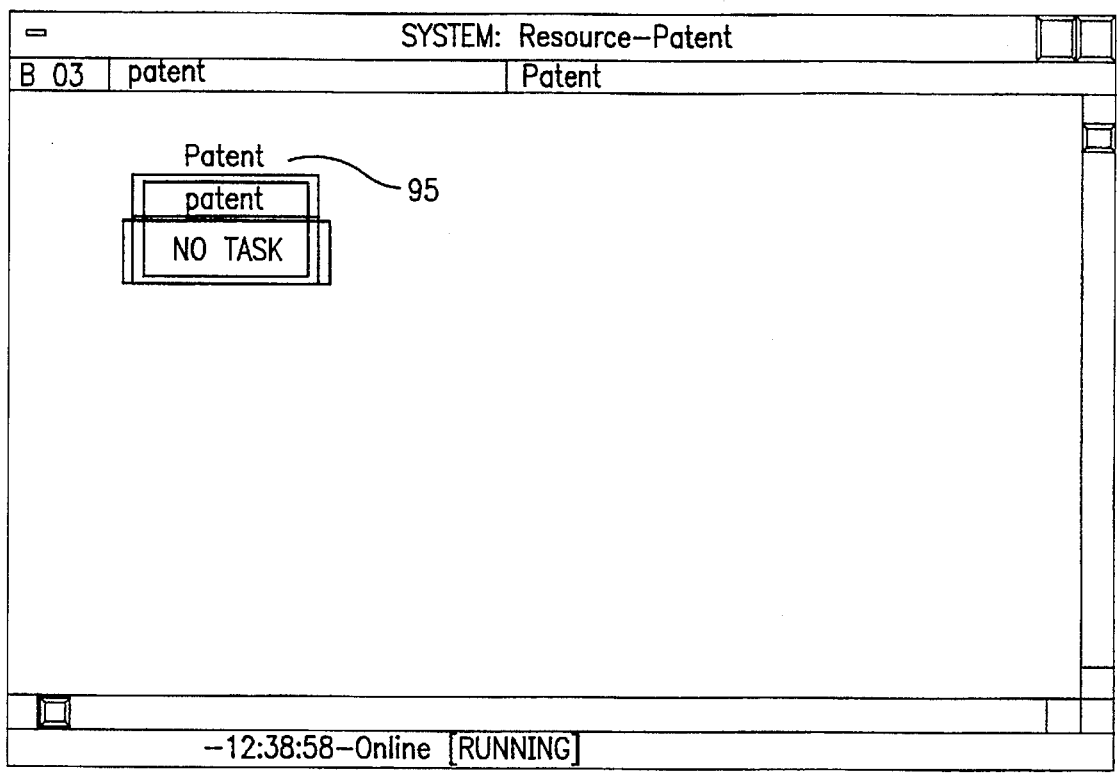

The first element in the network tree display (upper left of the display) is the resource element 94. If this element is opened (again, a selection of the element with the cell cursor and a double-click of the mouse or Enter key press on the keyboard will accomplish this), the resource display (FIG. 9) is displayed in a window. This is a special display that allows configuration of program block execution with various options. By placing a program block 95 on this display, the operator may create a new program block 95. The program block 95 may be named by selecting the program block 95 with the cell cursor, as usual, and typing the name on the keyboard. The operator may wish to open the program block 95 by selecting it and double-clicking the mouse or pressing Enter on the keyboard.

Figure 10:
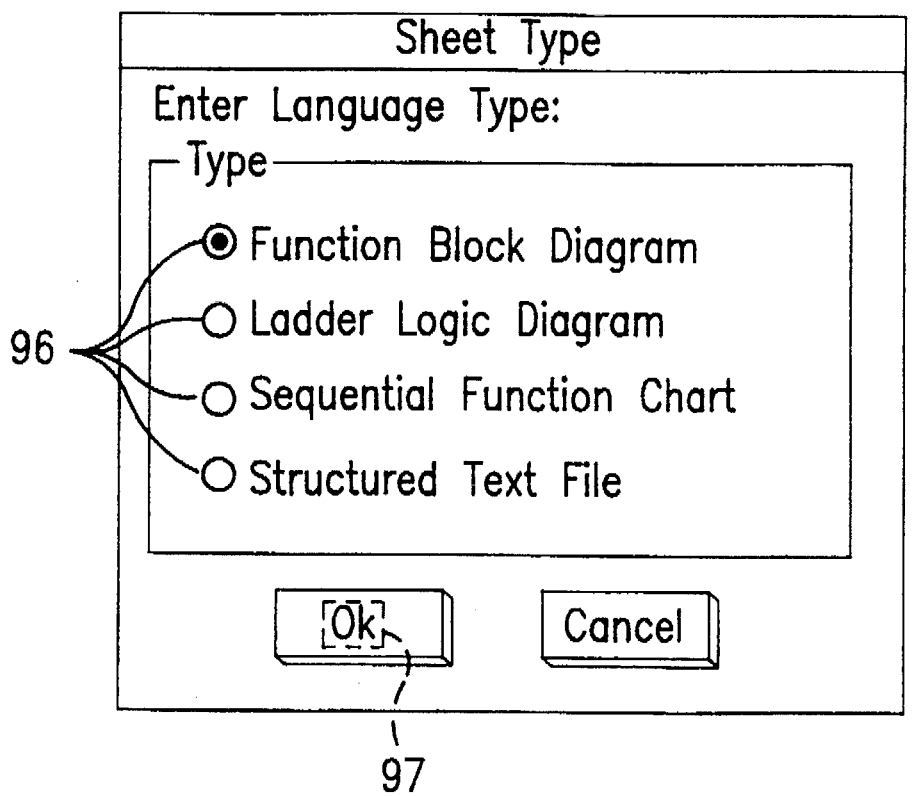

When the block 95 program is opened, a language selection dialogue box (FIG. 10) is presented, allowing the operator to select the language type of the program organizational unit to be programmed using radio buttons 96. Once this choice is made, and the Ok button 97 pressed, a page of the program is shown in a window. At this point, if the Sequential Function Chart language was selected as the language type, a sequential function chart may be created, using the editing controls present in the editor portion of the 4-mation™ software.

Once the sequential function chart is created, the program must be transferred to a controller, such as controller A in FIG. 1, via the communications line 18 as described earlier and using a conventional data transfer mechanism. This operation is initiated in the 4-mation™ software via the File menu choice 81 (FIG. 5) and the Transfer submenu choice 87 within the File menu. When the controller receives the program, it is ready to execute the program as directed by the user.

When the mode of programming is "online", while the program is displayed on the screen in a window, the operator may choose the Online menu 88 (FIG. 5), then choose the Display Real-Time Data submenu within the Online menu to enter a real-time mode of display. This display mode displays variable values read from the controller using conventional data read communication mechanisms of the communications system. These values are read periodically to provide rapidly updated data to the programmer station 16. The 4-mation™ software then uses the updating data to display these variable values in a manner appropriate to intuitive programmer understanding. For example, an active step in an SFC will be displayed as having a color-highlighted outline in contrast with an inactive step.

Once the real-time display mode has been entered online, the operator may display the SFC Mode dialogue box (FIG. 3). The dialogue box may then be used by the operator as described above to work with the sequential function chart (FIG. 4).

There has therefore been provided a system in which a programmer can analyze the correctness of a Sequential Function Chart program's logic. The system accomplishes this end through a number of provided facilities. One facility allows the evolution of the program to be arrested while retaining and displaying the state of the program variables. Another facility allows the enabling and disabling, and the activation and deactivation of program element capabilities, allowing a programmer to force the state of the program to known, possibly unusual, states for further analysis.

The thirteen-page program listing attached hereto and forming a part of the specification is the program in enhanced-C source code for the Chart Mode Dialogue Box.

While the invention has been described with particular reference to specific embodiments in the interest of complete definiteness, it will be understood that it may be embodied in a variety of forms diverse from those specifically shown and described, without departing from the spirit and scope of the invention.

What is claimed is:

1. A computerized distributed-control system comprising a plurality of distributed controllers and a programmer station including a programmable computer provided with a Sequential Function Chart program and interconnected with each of said controllers to interchange information and control data with said controllers, wherein said system comprises:

operator-controllable means for placing said Sequential Function Chart program at said programmable computer in any operator-selected one of a plurality of modes of operation, at least one of said modes being effective to interrupt evolving of said Sequential Function Chart program at a selected step to permit monitoring, editing and/or changing of said Sequential Function Chart program while it is in said at least one mode and while permitting said controllers to continue their operation.

2. The system of claim 1, wherein one of said modes is an OFF mode which interrupts the evolving of the Chart at the step(s) last current, prevents activation of step outputs and actions, and does not evaluate transitions.

3. The system of claim 1, wherein one of said modes is an AUTO mode in which normal execution of the program is permitted, including actions, evaluation of transitions and evolving of the Chart program, while permitting monitoring, editing and/or changing of the Chart program.

4. The system of claim 1, wherein one of said modes is a HOLD mode in which evolving of said Chart program is interrupted at the step(s) last current in the Chart's last-previous mode, and evolving of the Chart program to the next step is prevented.

5. The system of claim 1, wherein one of said modes is a MANUAL mode in which the evolving of the Chart is interrupted at the step(s) last current in the Chart's last previous mode, while the output of the current step(s) and any associated action blocks of the current step(s) are maintained active, transitions are prevented from being evaluated, and the operator is enabled to force the Chart program to any selected step thereof.

6. The system of claim 1, wherein one of said modes is a TRACE mode in which the evolving of the Chart program is interrupted at the step(s) last current in the Chart's last previous mode, while preventing evaluation of transitions, preventing action blocks from being activated even when the associated step is active, but permitting transitions to be forced by operator manipulation.

7. The system of claim 1, wherein said plurality of modes comprise all of the modes referred to in claims 2–6.

8. In a distributed process-control system comprising:

process control means comprising actuator means and sensing means for controlling and sensing the status of a process parameter, a programmer station, a controller responsible to said sensing means to control said actuator means and interfacing with said programmer station for sending signals regarding the status of said control means to said programmer station and for receiving signals from said programmer station to determine the program in said controller, said programmer station containing a Sequential Function Chart logic program for displaying on the programmer station monitor a chart of the logic which determines the functioning of said controller and to enable operator control of said logic:

the improvement comprising operator-selectable mode control means at said programmer station, operable by an operator with the aid of said Chart and said programmer station to enable said Sequential Function Chart to be monitored, edited and/or changed by the operator, said modes including an OFF mode for temporarily disabling the Sequential Function Chart, an AUTO mode which allows the Sequential Function Chart to run as configured, a HOLD mode which freezes the Chart at its current state, a MANUAL mode enabling the operator to force the Chart to operator-selected steps in the Chart while the output of the current step(s) are maintained active, and a TRACE mode enabling the operator to view the steps in the Chart sequentially, and to force the steps without executing them.

* * * * *